United States Patent Office 3,537,727
Patented Nov. 3, 1970

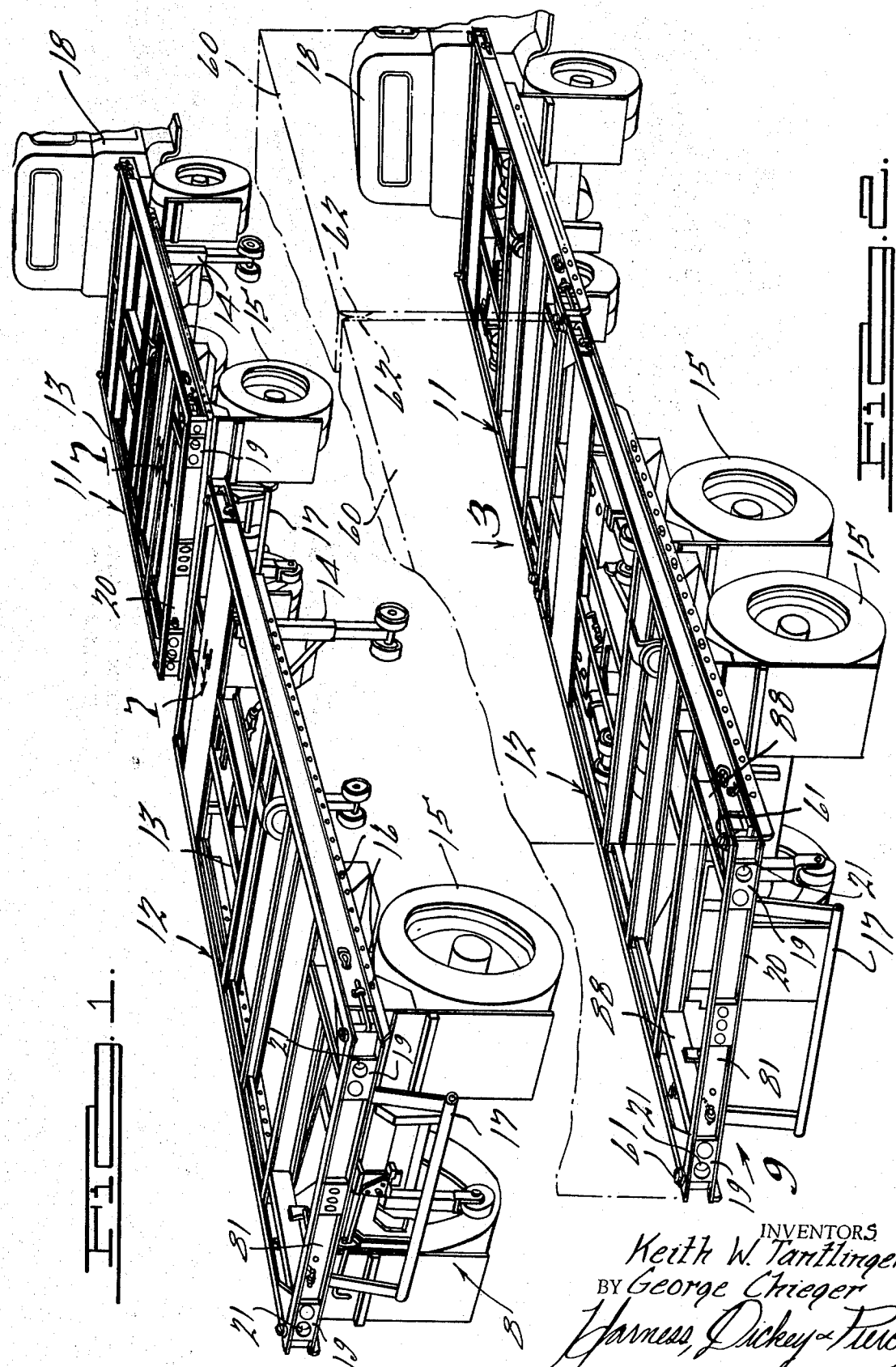

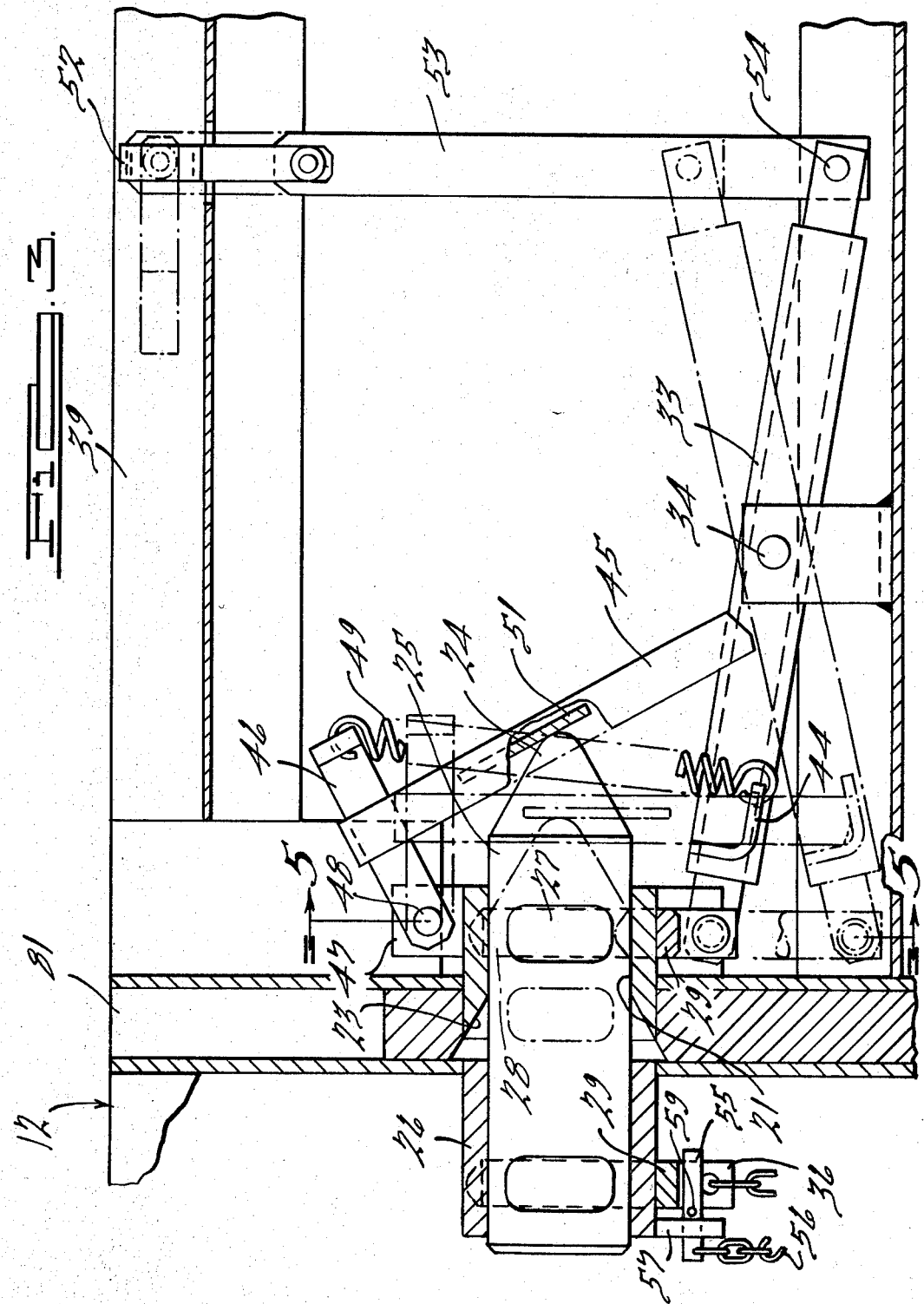

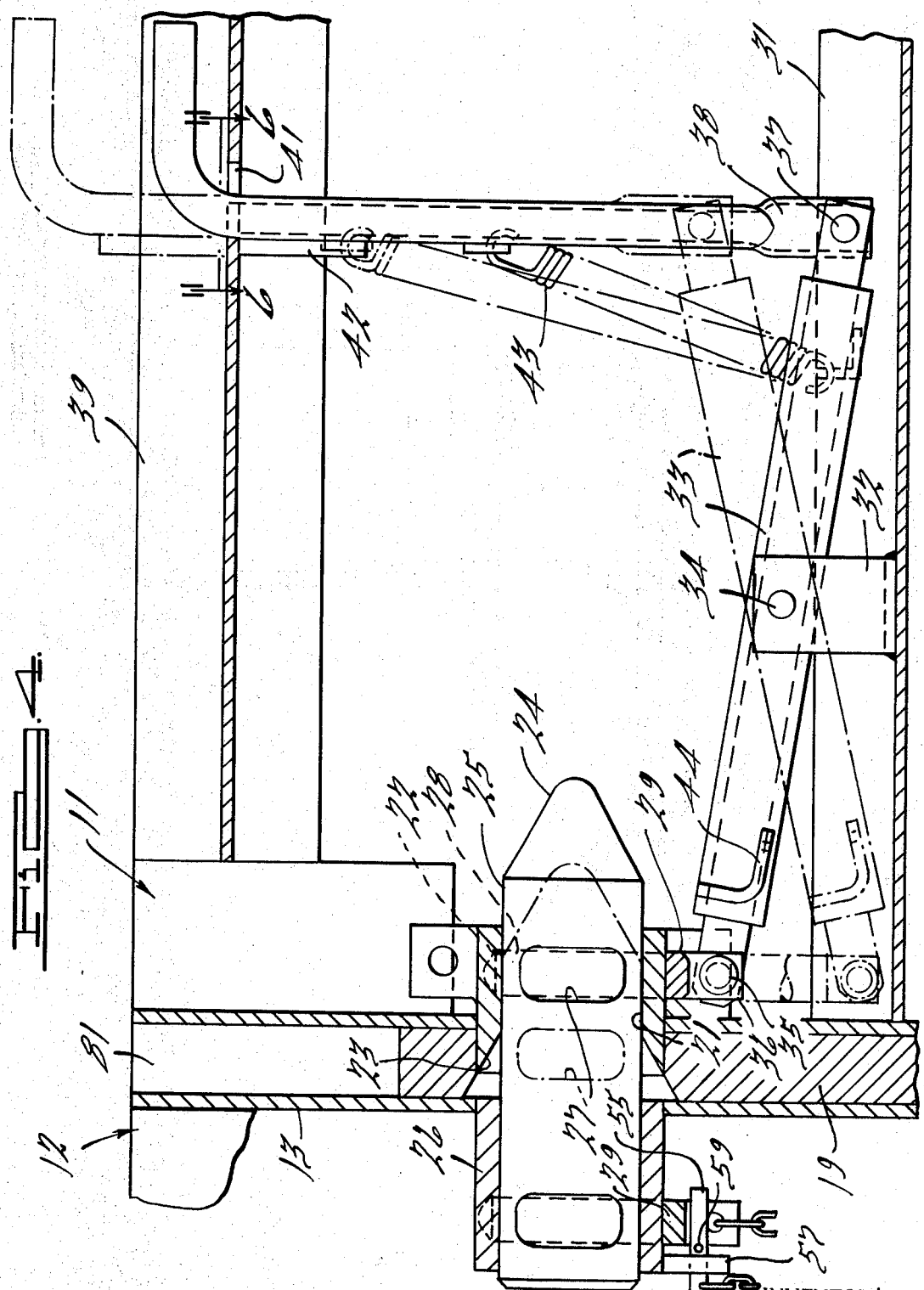

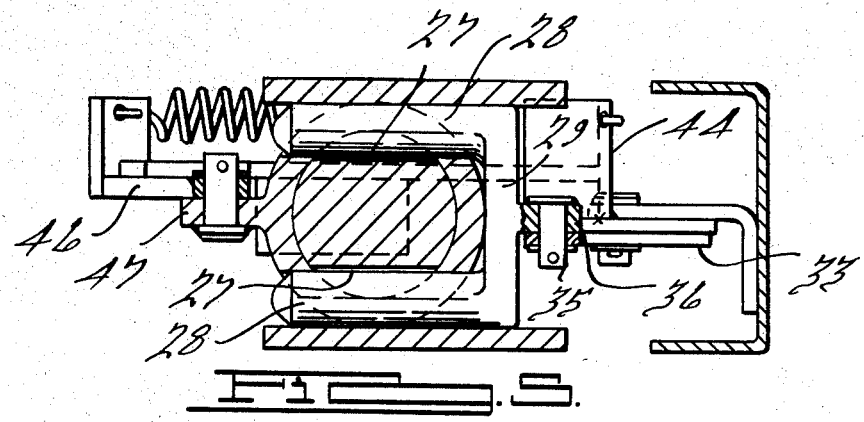
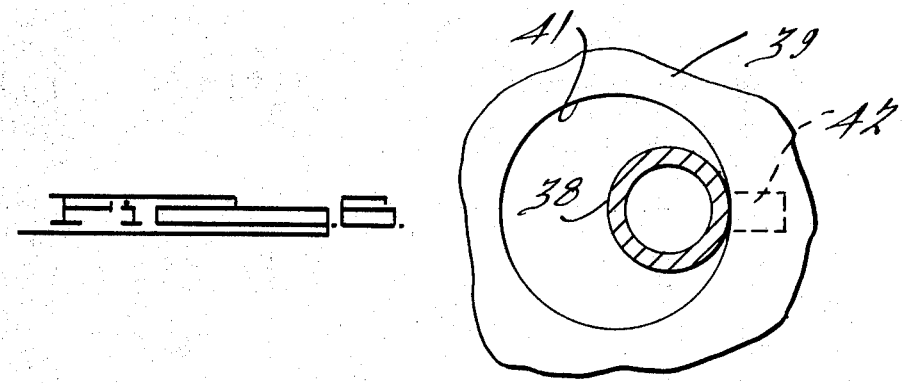
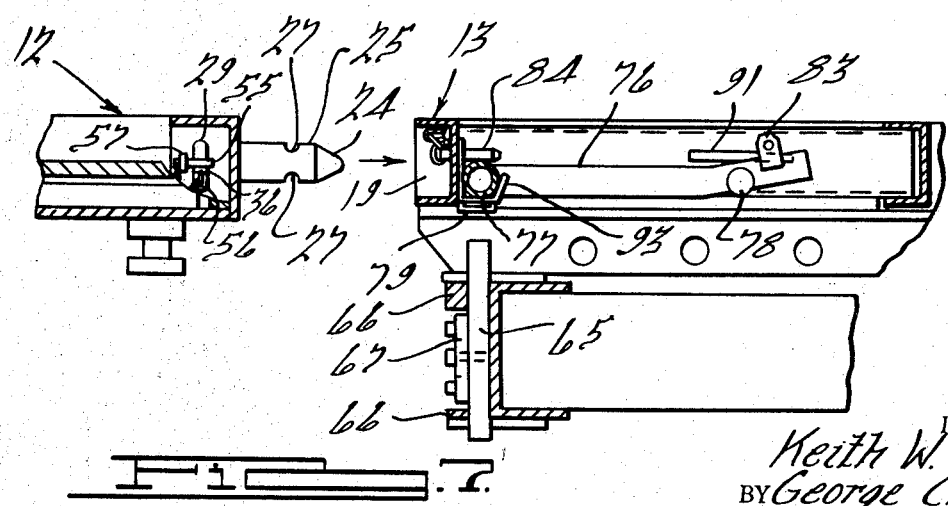

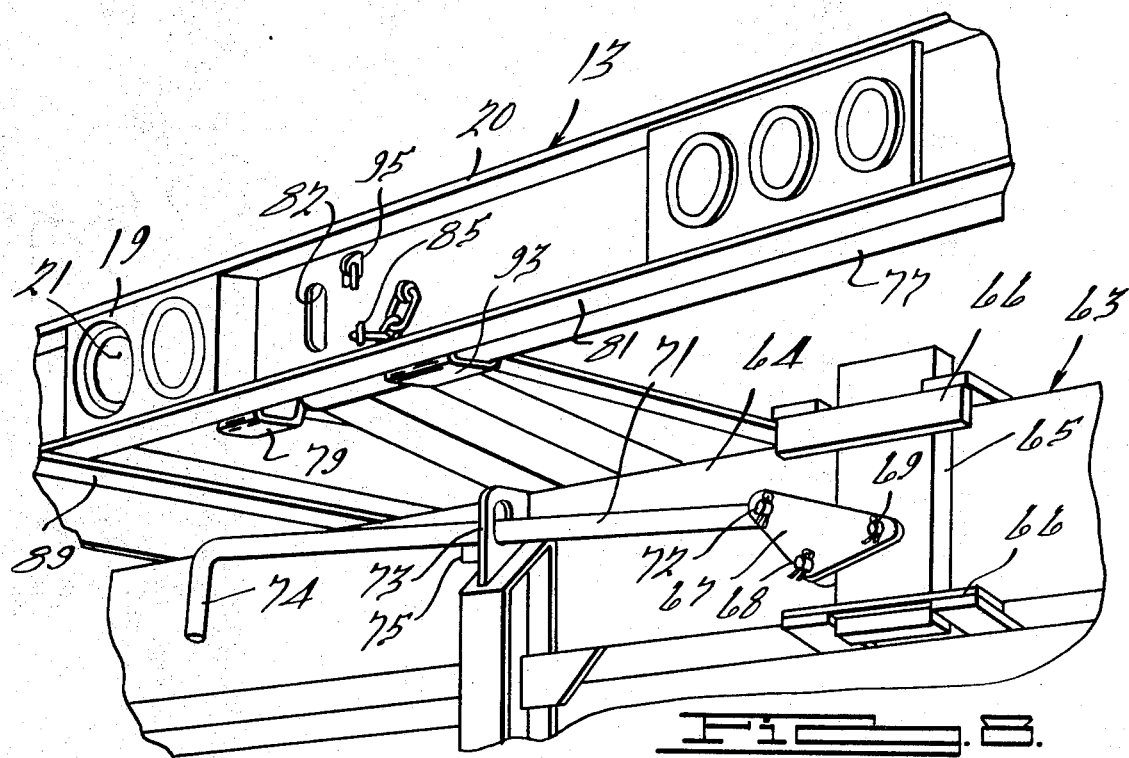
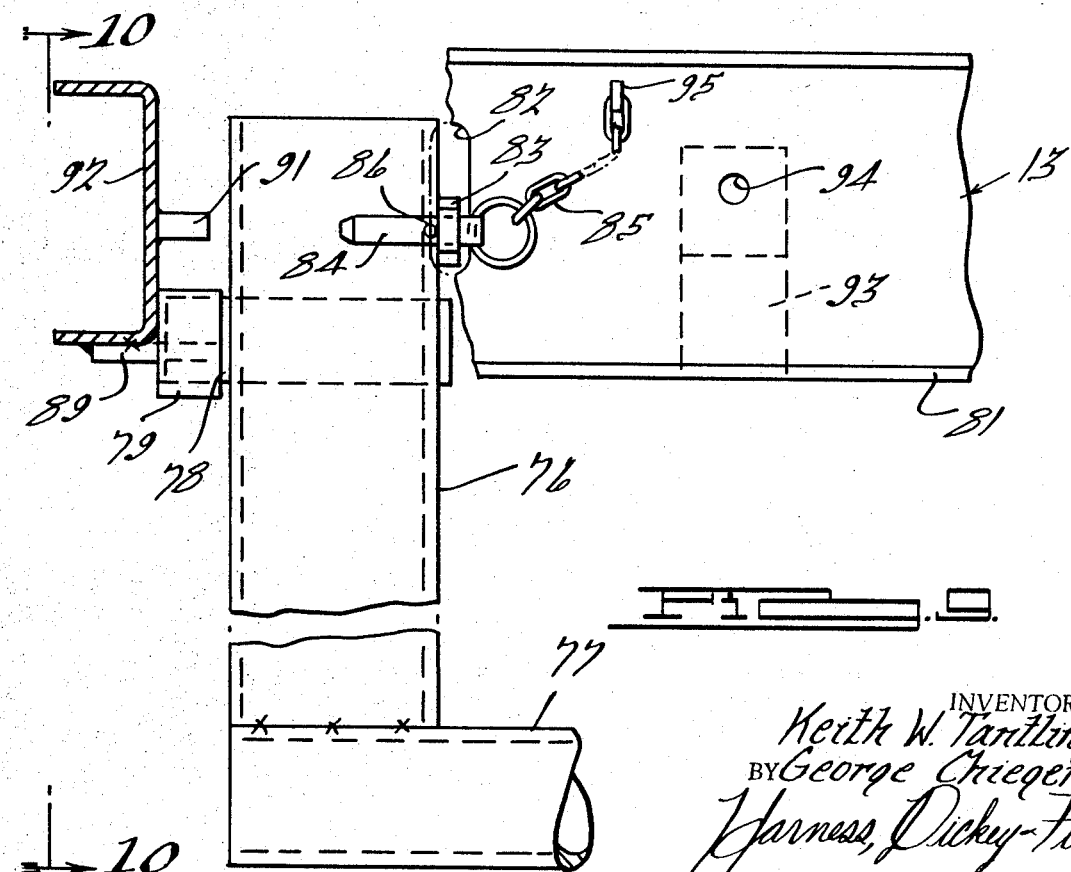

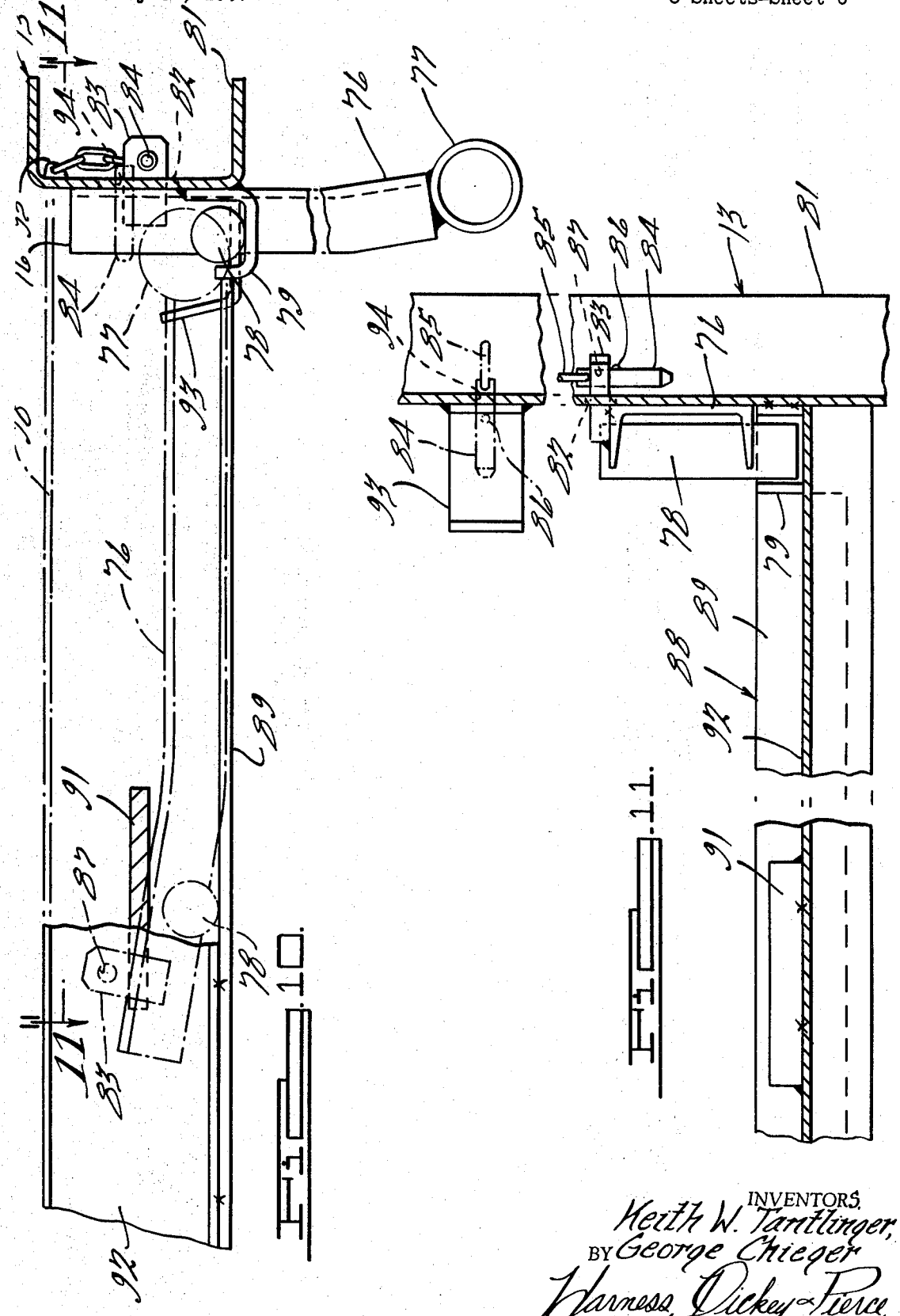

3,537,727
COUPLED CHASSIS
Keith W. Tantlinger, Grosse Pointe Shores, and George Chieger, Birmingham, Mich., assignors to Fruehauf Corporation, Detroit, Mich., a corporation of Michigan
Filed July 19, 1967, Ser. No. 654,603
Int. Cl. B62d 53/06
U.S. Cl. 280—415                    13 Claims

ABSTRACT OF THE DISCLOSURE

A semitrailer frame for carrying a separable container, the frame constituting a pair of rigidly interconnected but longitudinally separable and interchangeable units. Each unit is also usable as a semitrailer and has for such purpose, selectively longitudinally shiftable wheels and retractable landing gear actuated by shifting of the kingpin during coupling operation with a tractor or during assembly with another trailer unit to be joined in tandem relation when the trailer wheels are shifted towards the rear of the combined units.

BACKGROUND OF THE INVENTION

It has been the practice heretofore in the art to connect the containers which are mounted on individual frames, into firm fixed relation to each other so that the two frames with the wheels adjusted into tandem relation to each other on the rear frame can be drawn as a unit. The frames themselves were not interconnected in unit fixed relation to each other. The frame of the present invention is similar to that illustrated, described and claimed in the copending application of A. D. Sweda, et al., Ser. No. 669,771, filed Sept. 22, 1967, for "Trailer Frame Useable as a Base" and assigned to the assignee of the present invention.

SUMMARY OF THE INVENTION

The rear crossmembers of each of the frames have apertures for receiving projecting pins carried on the front crossmembers of the frames. A bifurcated element is employed for engaging oppositely disposed notches in the pins when locking the pins in the frame and the frames together. A rear bumper bar on the rear frame is locked in bumper position while the one on the forward frame is moved to nested position at the rear thereof. The air and electric lines are changed to be effective on the rear frame from the front frame the supply to which provided by the tractor. A plate at the rear of the front frame is raised to engage the kingpin at the front of the rear frame so that as the tractor moves rearwardly, it will first move the landing gear on the front frame and thereafter that on the rear frame from ground engaged position into nested position within the frames.

BRIEF DESCRIPTION OF THE DRAWINGS

FIG. 1 is a perspective of a pair of frames with a tractor at the forward end in position to back the front frame into locking engagement with the rear frame;

FIG. 2 is a view of the structure of FIG. 1, showing the frames in locked position;

FIG. 3 is an enlarged, broken, plan view of the structure illustrated in FIG. 2, as viewed from the point 3 thereof;

FIG. 4 is a view of structure, similar to that illustrated in FIG. 3, showing a different form thereof;

FIG. 5 is a broken sectional view of the structure illustrated in FIG. 3, taken on the line 5—5 thereof;

FIG. 6 is a broken sectional view of the structure illustrated in FIG. 4, taken on the line 6—6 thereof;

FIG. 7 is an enlarged, broken sectional view of the structure illustrated in FIG. 1, taken on the line 7—7 thereof;

FIG. 8 is an enlarged, broken view of the structure illustrated in FIG. 1, as viewed from the point 8 thereof;

FIG. 9 is an enlarged, broken view of the structure illustrated in FIG. 2, as viewed from the point 9 thereof;

FIG. 10 is a view of the structure illustrated in FIG. 9, as viewed from the line 10—10 thereof, and FIG. 11 is a broken sectional view of the structure illustrated in FIG. 10, taken on the line 11—11 thereof.

DESCRIPTION OF THE PREFERRED EMBODIMENTS

A pair of semitrailers 11 and 12 with containers shown in dot and dash line are illustrated in FIGS. 1 and 2 as being of like construction. Each of the trailers has a frame 13 and landing gear 14 which is the same as that illustrated, described and claimed in the above mentioned copending application. The frames have a pair of wheels 15, the support for which is secured to the frame by retractable pins 16 so that the wheels may be removed entirely from the frame or may be adjusted to different positions therealong. As illustrated in FIG. 2, the wheels 15 on the rear frame 12 have been advanced and the wheels 15 on the front frame 11 have been moved rearwardly and secured to the rear frame in tandem relation to the advanced rear wheels.

At the rear end of each of the frames a bumper 17 of the retractable type is provided. It will be noted that the bumper 17 on the front frame 11 has been raised and stowed before the frame is connected to the rear frame 12. The rearward movement of the tractor 18 causes the kingpin to be engaged and moved backwardly with its slide plate to swing the landing gear 14 upwardly into nested relation within the frame 13 as disclosed in the above-mentioned application. The legs of the landing gear on the frame of the rear semitrailer 12 may be adjusted vertically to accurately align the two frames before the tractor is further moved rearwardly into secured relation to the rear frame.

The rear crossmember 20 of each frame has a housing 19 near each end containing a cylindrical aperture 21 intersected by a pair of vertically spaced transverse apertures 22 through the top and bottom thereof. The forward part of the wall of the apertures 21 may have a tapered section 23 for receiving the tapered end 24 of pins 25. The pins are carried in sleeves 26 in the front crossmember of the rear frame 13 in alignment with the aperatures 21 in the housings 19 in the rear crossmember of the front frame. The pin 25 has diametrical disposed transverse recesses 27, as illustrated more specifically in FIGS. 5 and 7, which receive a pair of pins 28 of a yoke 29, which are slidable through the transverse apertures 22 in the housing 19 and those in the sleeve 26. The pins 28 in the sleeve 26 support the base of the pin 25 at the forward end of the rear frame 13. The pins 28 in the recesses 27 secure the pins 25 to the rear of the front frame 13.

In FIG. 4, manual actuated device is illustrated for operating the yoke 29. An inner rail 31 of the frames 13 has a U-shaped element 32 welded thereto to which a lever 33 is secured by a pivot 34. The forward end of the lever 33 is secured by a pivot 35 to a bifurcated boss 36 located centrally of the yoke 29. The opposite end of the lever 33 is secured by a pivot 37 to a manually actuatable lever 38. The lever extends through the side rail 39 at each side of the frame 13 through an aperture 41 which is elongated lengthwise of the frame to permit a locking bar 42 to pass therethrough. The levers 38 are pulled outwardly to move the pins 28 of the yokes 29 outwardly from engagement with the pins 25 to thereby release the extending end of the pins and permit the rear frame to be separated from the front frame. A spring 43 interconnects the levers 33 and 38 and retains the lever 38 in latched position to maintain the pins 28 in retracted position.

In FIG. 3, a similar construction is illustrated that wherein an angle bracket 44 is carried by the lever 33 which is engaged by a finger 45 mounted on a link 46 which is pivoted to a boss 47 by a pin 48. The boss is mounted in extension of the housing 19. The end of the link 46 is connected by a spring 49 to the bracket 44 for urging the finger 45 into engagement therewith, as illustrated in dot dash line position for retaining the yoke 29 in disengaged position. A plate 51 extends outwardly on the finger 45 in position to be engaged by the tapered end 24 of the pin 25 when advancing into the aperture 21 in the housing 19. The inward movement of the pin 25 moves the plate 51 and finger 45 counterclockwise to thereby release the finger from the bracket 44 and permit the spring 49 to swing the lever 33 clockwise to advance the yoke 29 and move the pins 28 into the recesses 27 of the pin.

A handle 52 is pivotally mounted on a link 53 which is secured by a pin 54 to the lever 33. The handle 52 is grasped by the operator and pulled outwardly when the pins 28 of the yoke 29 are to be retracted permitting the finger 45 to move into engagement with the bracket 44 and the pin 25 to be withdrawn. When so locked in their retracted position, the handles 52 may be swung to a position parallel to the rail 39 to nest therewithin. When longer pins are desired, they may be substituted for the ones shown or longer pins may be provided with spaced sets of recesses 27 in the base end so as to be secured in different positions in the sleeve 26. A pin 55, on a chain 56 secured to the boss 36 of the yoke 29, extends through an aperture in a bracket 57 on the sleeve 26 retained therein by a spring press detent 59. This prevents the outward movement of the yoke 29 from the base of the pin 25 after being moved into engaged position, as illustrated in FIG. 3.

As illustrated in FIG. 2, each of the frames 13 have a container 60 secured thereon in the usual manner by rotatable heads 61 at the corners of the frame which project into apertures in the bottom corners of the containers and when rotated lock the containers to the frame. The containers have projecting frames 62 at least at the forward and rearward top portion which abut each other when the frames 13 are in locked relation to prevent the joined end of the frame from sagging out of a plane of alignment with each other. In case the projecting frames are not provided on the top portion of the containers, spacers are employed at the top corners of the containers to prevent them from moving toward each other and the frames to sag.

Referring to FIG. 8, the pair of wheels are carried on a dolly 63 which as mentioned above, is removably secured to the frame 13, the frame of the dolly having a rear bolster 64. The rear face of the bolster 64 has a heavy slide plate 65 retained thereagainst by U-shaped brackets 66. A triangular link 67 is secured on a pivot 68 mounted on the bolster 64 and secured by a pivot pin 69 to the slide plate 65. A rod 71 is secured by a pin 72 to the link 67 and passes through an aperture in a bracket 73 on the bolster. The rod has a right-angled end 74 which forms a handhold. The aperture in the bracket 73 is elongated and the rod has a downwardly extending boss 75 for locking the rod when pulled outwardly to raise the slide plate 65 for retaining the plate in raised position. When raised, the upper portion of the plate 65 is in position to engage the kingpin on the slide plate of the rear frame 13 when the front frame is moved backwardly to be attached thereto. The engagement of the kingpin and the movement of its slide plate rearwardly will raise the landing gear of the rear frame to nested position therewithin in the manner disclosed in the above mentioned application. By the backing of the tractor, the landing gear of the front frame is nested therewithin and the further movement of the front frame rearwardly into engaged position with the rear frame will raise the rear landing gear to nested position therewithin.

Referring more specifically to FIGS. 9, 10 and 11, the bumper 17 is of the retractable type embodying a pair of channel elements 76 which support a heavy tube 77 at the bottom ends. The channel elements have pins 78 secured thereto which extend laterally outwardly thereof. In the operative position of the bumper, the pins 78 rest within U-shaped brackets 79 with the upper end of the channel elements 76 abutting a rear channel member 81 of the frame. The web of the channel element contains slots 82 through which a finger 83 on the upper end of the channel elements 76 extends. The finger is secured in position by a pin 84 which has a chain 85 on one end and a spring pressed detent 86 in the body which prevents the pin from moving from an aperture 87 in the fingers 83. The pins lock the bumper in operable position at the end of the frame.

The bumper on the front frame is raised and nested within longitudinal channels 88 at the rear end of the frame 13. The pins 84 are first removed and the bumper is raised to have the upper end of the channel elements 76 tilt forwardly and slide upon a flange 89 of the channels 88 to advance therealong until they move beneath a plate 91 which is welded to the webs 92 of the channel elements 88. After the tube 77 has been advanced sufficiently it is raised and dropped into a pair of U-shaped brackets 93 to support the bumper within the frame. The pins 84 are then inserted in apertures 94 in the web of the channel member 81 to lock the tube 77 in position within the brackets 93. The chains 85 are secured on fingers 95 which are welded to the channel member 81. By removing the pins 84 the tube 77 may be raised, moved forwardly and dropped below the brackets 93 and drawn outwardly and downwardly to move the pins 78 into the brackets 79. The forward movement of the tube 77 moves the fingers 82 through the apertures 82 after which they are secured by the pin 84, as illustrated in FIGS. 9, 10 and 11. When the two frames 13 are to be connected together, as pointed out above, the bumper on the forward frame 13 will be moved to nested position, as clearly illustrated in FIG. 2.

When connecting the two frames together, a check should be made to assure that the containers are securely locked to the frames. The bumper 17 on the front frame is then raised and moved to stowed position leaving the bumper on the rear frame in lowered locked position. When the containers are so constructed as to not be in abutting engagement at the top when the frames are locked together, spacer blocks are inserted at the upper corner castings of one of the containers in position to be joined to the other container. The tractor is then moved rearwardly after the locking blocks for the slide plates containing the kingpin have been raised to permit the landing gear to be raised as the kingpins are moved rearwardly by the tractor. The landing gear legs of the rear frame are adjusted to align the front of the rear frame with the rear of the front frame, the service and emergency air lines are disconnected from the front wheel dolly 63 and the slide plate 65 is raised on the dolly of the front frame in position for engaging the kingpin of the rear frame.

With the wheels held stationary, the tractor moves the front frame rearwardly until its landing gear is raised and locks in stowed position. The tractor and front frames are moved rearwardly in a straight line to move the apertures 21 at the rear of the front frame over the pins 25 at the front of the rear frame. The pins 28 of the yokes 29 are inserted through the apertures 21 of the housings 19, as illustrated in FIGS. 3 and 4. The index pins and locking handle on the rear dolly are moved to retracted position and the tractor and the engaged frames are moved rearward to advance the rear dolly to tandem position on the rear frame where it is locked by the insertion of the index pins. The index pins and locking handle for the dolly on the front frame are retracted and the tractor and frames are moved forwardly over the front dolly until the dolly of the front frame is in tandem relation to the dolly of the rear frame where it is locked to the rear frames by the insertion of the index pins thereof into apertures in the rear frame. A check is then made to see that the locking handles for the index pins of both dollys are in secured position.

The service and emergency air lines are connected from the rear dolly to the front dolly. The electric lines are disconnected from the socket on the front frame and connected with those of the rear frame and checked to make certain that the brakes on the wheels and lights on the rear frame are properly operating. With this arrangement the two frames having containers of substantial length are connecting together to provide a semitrailer of substantial length. The frames will be retained in horizontal planar relation to each other when the containers abut each other at the top or have the top spacer blocks therebetween.

What is claimed is:

1. In a frame assembly including a pair of frames in tandem relation, each frame having a crossmember at the front and rear thereof, said frames having aligned apertures in said front and rear crossmembers, pins of uniform diameter for connecting the two frames together in end to end relationship, said pins being insertable in the adjacent apertures of the two frames, and means for securing the opposite ends of the inserted pins in fixed position within the respective aperture, and containers releasably secured to the front and rear frames with means at the top of the containers for resisting a downward bending at the junction of the frames.

2. In a frame assembly as recited in claim 1, wherein a bumper is provided at the rear end of the frames which is stowable within the frame, that on the front frame being stowed before the frames are coupled together.

3. In a frame assembly as recited in claim 2, wherein means are provided for securing the bumper in operative and in stowed positions.

4. In a frame assembly as recited in claim 1, wherein a landing gear is provided at the front end of the frames locked to a side plate carrying a kingpin when the landing gear is in ground-engaged position and which is moved rearwardly by the tractor when engaging the kingpin for raising and supporting the landing gear in nested position within the frame, and a movable plate carried at the rear of the front frame which is shiftable to a position for engaging the kingpin on the slide plate of the rear frame for moving the kingpin and slide plate of the rear frame and raising and nesting the landing gear therewithin.

5. In a frame assembly as recited in claim 1, wherein means actuated by the inserted end of the pins moves the securing means in pin secured position.

6. In a frame assembly as recited in claim 1, wherein the pins in the front and rear frames are locked therein by pins on a yoke which engage semicylindrical apertures on the opposite side of the connecting pins within the apertures.

7. In a frame assembly as recited in claim 6, wherein the connecting pins have a series of aligned semicylindrical apertures which permits the extension of the pins different amounts from the supporting apertures at the front of the frame and permits the complete retracion of the connecting pins within the apertures.

8. In a frame assembly as recited in claim 1, wherein a yoke has spaced pins employed for engaging aligned apertures in opposite sides of the connecting pin for lock of the yoke, and an operating arm for moving the lever and the yoke to shift the pins to engaged and disengaged positions.

9. In a frame assembly as recited in claim 8, wherein a pivotal finger engages a boss on the lever for retaining the yoke in pin-disengaged position, a plate on the pivoted finger engageable by the end of the connecting pin during the pin in position, a pivotal lever engaging the ending its advancement for releasing the pivoted finger, and spring means for moving the pins of the yoke into engaged position.

10. In combination with a pair of freight handling devices having circular coupler receiving apertures in the end walls thereof, respectively, a coupler comprising:

a cylindrical member having an intermediate portion of constant diameter so as to be telescopically receivable, respectively, in said apertures in radial load transfer relationship and movable to selected positions axially thereof, a plurality of axially spaced diametrically orientated pairs of parallel chordal locking grooves on said cylindrical member, at least one pair of locking grooves being disposed at opposite ends of said cylindrical member, and a pair of generally U-shaped locking members having bight portions and spaced leg portions, respectively, the spacing of the leg portions of said locking members being complementary to the diametrical spacing of the locking grooves in said cylindrical member so as to be receivable therein in axial load transfer relationship in opposite directions relative to the central axis of said coupler, the leg portions of said locking members being receivable in locking member apertures in said freight handling devices, respectively, said locking member apertures extending normally to the central axis of the coupler accepting apertures for the reception of said locking members in axial load transfer relationship relative to the central axis of said coupler.

11. In a frame assembly for a trailer utilizing one or more of said frames, said frame having aligned apertures at the front and rear end, pins insertable in the apertures of two frames for connecting them together in end to end relationship, said pins having at least one transverse notch at each end, and finger means carried by each frame insertable in said notch after the pin has been inserted in the aperture for locking the pin therewithin.

12. In a frame assembly as recited in claim 11, wherein a pair of parallel notches are provided at each end of the pin on opposite sides thereof and wherein the wall of the aperture of the frame has transverse openings in alignment with the notches at the end of the pins, and a yoke having spaced pins thereon which are insertable through the notches in the pin and the wall of the aperture for locking one end of the pins therein.

13. In a frame assembly as recited in claim 12, wherein two pairs of parallel notches are provided adjacent to one end of the pin so that it may be adjusted in different positions within the aperture in which it was inserted.

References Cited

UNITED STATES PATENTS

| | | | |
|---|---|---|---|
| 2,097,113 | 10/1937 | Bradley | 280—5 |
| 2,390,479 | 12/1945 | Watson et al. | 108—44 X |
| 2,678,831 | 5/1954 | Fisher. | |
| 3,102,738 | 9/1963 | De Roshia | 280—415 |
| 3,210,110 | 10/1965 | Chieger | 293—73 |
| 3,105,703 | 10/1963 | Rittenhouse | 280—415 |
| 3,321,214 | 5/1967 | Tantlinger | 280—415 |
| 3,359,605 | 12/1967 | Hulverson et al. | 24—211 |
| 3,370,878 | 2/1968 | Carr | 293—73 X |
| 3,402,943 | 9/1968 | Martin | 280—415 |

LEO FRIAGLIA, Primary Examiner

U.S. Cl. X.R.

293—73, 69; 280—34; 296—35

PO-1050
(5/69)

UNITED STATES PATENT OFFICE
CERTIFICATE OF CORRECTION

Patent No. 3,537,727  Dated November 3, 1970

Inventor(s) Keith W. Tantlinger and George Chieger

It is certified that error appears in the above-identified patent and that said Letters Patent are hereby corrected as shown below:

Column 1, line 49 after "which" should be --is--. Column 4, line 39 "82" should be --83--. Column 5, line 71 after "lock-" should be --ing the pin in position, a pivotal lever engaging the end--. Column 5, line 73 after "the" should be --yoke--. Column 6, line 4 "ing the pin in position, a pivotal lever engaging the end" Delete the entire line, misprinted.

SIGNED AND
SEALED
JAN 19 1971

(SEAL)
Attest:

Edward M. Fletcher, Jr.
Attesting Officer

WILLIAM E. SCHUYLER, JR.
Commissioner of Patents